(12) United States Patent
Garrett et al.

(10) Patent No.: US 9,384,303 B2
(45) Date of Patent: Jul. 5, 2016

(54) EVALUATION OF SUBSTITUTION CONTEXTS

(71) Applicant: Google Inc., Mountain View, CA (US)

(72) Inventors: Zachary A. Garrett, Tokyo (JP);
Takahiro Nakajima, Chiba (JP); Akira Ishino, Tokyo (JP)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/961,200

(22) Filed: Aug. 7, 2013

(65) Prior Publication Data

US 2014/0365515 A1    Dec. 11, 2014

Related U.S. Application Data

(60) Provisional application No. 61/833,332, filed on Jun. 10, 2013.

(51) Int. Cl.
*G06F 17/30* (2006.01)

(52) U.S. Cl.
CPC .... *G06F 17/30967* (2013.01); *G06F 17/30672* (2013.01)

(58) Field of Classification Search
USPC .................. 707/759, 723, 748, 736, 802, 758
See application file for complete search history.

(56) References Cited

U.S. PATENT DOCUMENTS

| | | | |
|---|---|---|---|
| 5,371,807 A * | 12/1994 | Register et al. | 382/159 |
| 6,424,983 B1 * | 7/2002 | Schabes et al. | 715/257 |
| 7,856,441 B1 | 12/2010 | Kraft et al. | |
| 8,086,620 B2 | 12/2011 | Parikh et al. | |
| 8,103,669 B2 * | 1/2012 | Castellani | G06N 5/025 707/736 |
| 8,122,016 B1 * | 2/2012 | Lamba | G06F 17/3053 707/723 |
| 8,504,562 B1 | 8/2013 | Ikeda | |
| 8,600,973 B1 | 12/2013 | Popovici | |
| 8,868,587 B1 | 10/2014 | Subramaniam | |
| 8,965,875 B1 | 2/2015 | Popovici | |
| 2006/0069675 A1 | 3/2006 | Ogilvie | |
| 2006/0103859 A1 * | 5/2006 | Duncan et al. | 358/1.8 |
| 2007/0011154 A1 | 1/2007 | Musgrove | |
| 2007/0038600 A1 | 2/2007 | Guha | |
| 2007/0271286 A1 | 11/2007 | Purang | |
| 2008/0104071 A1 * | 5/2008 | Pragada et al. | 707/6 |
| 2009/0198684 A1 | 8/2009 | Collins et al. | |

(Continued)

FOREIGN PATENT DOCUMENTS

EP    0953970 A2 * 11/1999

OTHER PUBLICATIONS

U.S. Appl. No. 13/961,289, filed Aug. 7, 2013, Garrett et al.

*Primary Examiner* — Hung T Vy
(74) *Attorney, Agent, or Firm* — Fish & Richardson P.C.

(57) ABSTRACT

Methods, systems, and apparatus, including computer programs encoded on computer storage media, for evaluating substitute terms. One of the methods includes receiving a query and identifying an original term occurring in the query. One or more substitution contexts are determined for the original term, wherein a substitution context includes one or more context terms and an indication of a position in the query of the original term and the one or more context terms. A score is determined for each substitution context of the one or more substitution contexts. One or more substitution contexts are selected based on the score of each substitution context. One or more substitute terms for the original term in the context of the one or more selected substitution contexts are determined.

23 Claims, 7 Drawing Sheets

(56) References Cited

U.S. PATENT DOCUMENTS

2012/0041979 A1* 2/2012 Lee ................... G06N 5/022 707/776

2012/0330937 A1 12/2012 Frazier
2013/0021346 A1* 1/2013 Terman ................... G09B 5/08 345/467
2015/0205866 A1 7/2015 Shaw

* cited by examiner

EVALUATION OF SUBSTITUTION CONTEXTS

CROSS-REFERENCE TO RELATED APPLICATIONS

This application claims the benefit under 35 U.S.C. §119(e) of the filing date of U.S. Provisional Patent Application No. 61/833,332, filed on Jun. 10, 2013, entitled "Evaluation of Substitution Contexts," the entirety of which is herein incorporated by reference.

BACKGROUND

This specification generally relates to search engines, and one particular implementation relates to evaluating substitution contexts for substitution rules that are used in revising search queries.

To identify documents that are responsive to search queries, a search engine may match query terms, or substitute terms of the query terms, with terms that occur in the documents, or with terms that occur in metadata associated with the documents.

SUMMARY

Search systems use query revision engines to revise search queries, for example to include substitute terms of query terms. To identify a substitute term of a query term, query revisers evaluate candidate substitute terms according to various criteria, such as criteria that estimate whether, in a particular context, a candidate substitute term is a good substitution of the query term. "Goodness" of a particular candidate substitute term may be expressed, for example, by the amount of confidence, trust, consistency, reliability, or other characteristic that defines an association between a query term and the candidate substitute term.

A system can evaluate a substitution context associated with an original term based on whether the substitution context adds significant meaning to the original term. Good substitution contexts are meaningful and useful in that they help to disambiguate the meaning of the original term when choosing substitute terms. Bad substitution contexts, on the other hand, do little to disambiguate the meaning of the original term, introduce noise into the system, and can cause the system to generate unreliable substitute terms. The system can discard bad contexts before generating substitution rules, "offline" evaluation, and the system can select a number of the best substitution contexts at query revision time, "online" evaluation.

In general, one innovative aspect of the subject matter described in this specification can be embodied in methods that include the actions of receiving a query having an original term; determining one or more substitution contexts for the original term, wherein a substitution context includes one or more context terms and an indication of a position in the query of the original term and the one or more context terms; classifying the substitution contexts into a first category or a second category based on a respective score of each substitution context; and associating the original term with one or more substitution contexts in the first category. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Classifying a substitution context into the first category comprises determining a score for each substitution context of the one or more substitution contexts; and determining that the score satisfies a threshold. The actions include generating a context hierarchy of the one or more substitution contexts, wherein conditions of the parent context also apply to the child context, wherein determining a score for a substitution context comprises comparing a particular substitution context to its parent substitution context. A child context of a parent context in the context hierarchy includes an additional term that does not occur in the parent context. A child context of a parent context in the context hierarchy includes one or more terms that have a class/instance or category/object relationship with one or more terms of the parent context. Determining a score for a substitution context comprises generating first frequencies of occurrence for alternate terms that occur in the substitution context in a textual collection; generating second frequencies of occurrence for alternate terms that occur in the parent substitution context in the textual collection; and comparing the first frequencies of occurrence and the second frequencies of occurrence. The actions include determining a first score for a first parent substitution context of the substitution context; determining a second score for a second parent substitution context of the substitution context; and selecting the minimum of the first score or the second score. The actions include determining that at least one substitution context is classified in the first category; and in response to determining that at least one substitution context is in the first category, classifying the general context into the second category. The actions include determining that no substitution contexts are classified in the first category; and in response to determining that no substitution contexts are in the first category, classifying the general context into the first category. Associating the original term with one or more substitution contexts in the first category comprises providing substitution contexts in the first category to a substitute term generation process that generates substitute terms for the original query term. Particular embodiments of the subject matter described in this specification can be implemented so as to realize one or more of the following advantages. Classifying substitution contexts as good or bad can improve the quality of substitution rules generated. Discarding bad contexts makes statistics calculation faster by eliminating data collection for bad contexts, which also makes the size of the substitution rule data smaller. Additionally, removing bad contexts improves substitution rule accuracy, as bad contexts may introduce unreliable or spurious substitute terms or incorrectly indicate that a substitute term is a bad substitute term.

In general, another innovative aspect of the subject matter described in this specification can be embodied in methods that include the actions of receiving a query; identifying an original term occurring in the query; determining one or more substitution contexts for the original term, wherein a substitution context includes one or more context terms and an indication of a position in the query of the original term and the one or more context terms; determining a score for each substitution context of the one or more substitution contexts;

selecting one or more substitution contexts based on the score of each substitution context; and determining one or more substitute terms for the original term in the context of the one or more selected substitution contexts. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Selecting one or more substitution contexts based on the score of each substitution context comprises selecting a highest-scoring substitution context. Selecting one or more substitution contexts based on the score of each substitution context comprises classifying the substitution contexts into a first category or a second category based on the respective score of each substitution context; and selecting substitution contexts in the first category. The actions include generating a context hierarchy of the one or more substitution contexts, wherein conditions of the parent context also apply to the child context, wherein determining a score for a substitution context comprises comparing a particular substitution context to its parent substitution context. A child context of a parent context in the context hierarchy includes an additional term that does not occur in the parent context. A child context of a parent context in the context hierarchy includes one or more terms that have a class/instance or category/object relationship with one or more terms of the parent context. Determining a score for a substitution context comprises comparing a particular substitution context to the general context; and computing a combined score using the comparison of the particular substitution context to the general context and the comparison of the particular substitution context to the general context. Determining a score for a substitution context comprises generating first frequencies of occurrence for alternate terms that occur in the substitution context in a textual collection; generating second frequencies of occurrence for alternate terms that occur in the parent substitution context in the textual collection; and comparing the first frequencies of occurrence and the second frequencies of occurrence. The actions include determining a first score for a first parent substitution context of the substitution context; determining a second score for a second parent substitution context of the substitution context; and selecting the minimum of the first score or the second score. The actions include computing a score between two of the selected substitution contexts that represents how closely the substitution contexts agree; determining, based on the score, that the substitution contexts do not agree; and in response to determining that the substitution contexts do not agree, decreasing a weight given to substitute terms for the original term generated using the substitution contexts that do not agree. The actions include computing a score between two of the selected substitution contexts that represents how closely the substitution contexts agree; determining, based on the score, that the substitution contexts agree; and in response to determining that the substitution contexts agree, increasing a weight given to substitute terms for the original term generated using the substitution contexts that agree.

Particular embodiments of the subject matter described in this specification can be implemented so as to realize one or more of the following advantages. Classifying substitution contexts as good or bad can improve the quality of substitution rules generated. Discarding bad contexts makes statistics calculation faster by eliminating data collection for bad contexts, which also makes the size of the substitution rule data smaller. Additionally, removing bad contexts improves substitution rule accuracy, as bad contexts may introduce unreliable or spurious substitute terms or incorrectly indicate that a substitute term is a bad substitute term.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
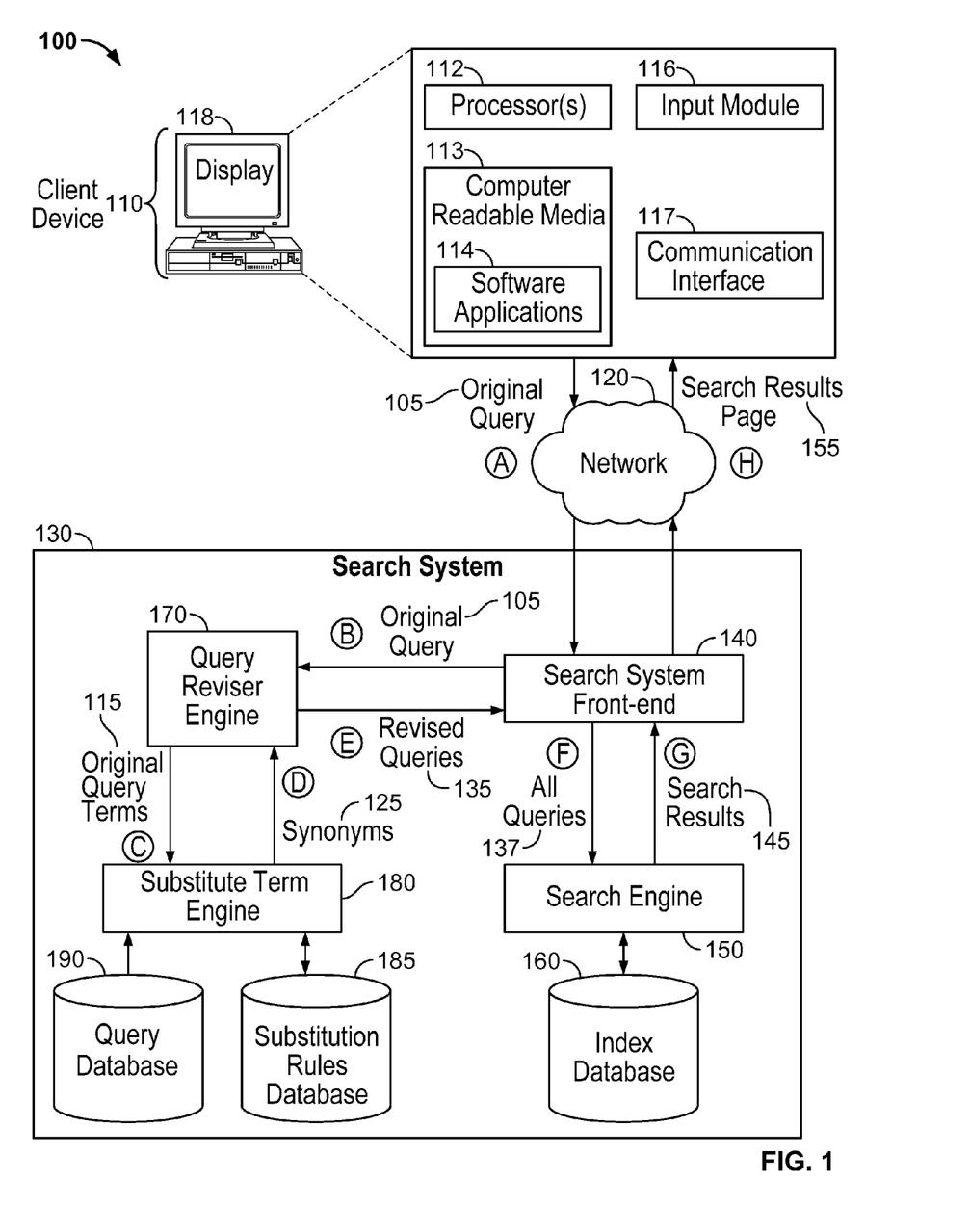
FIG. 1 is a diagram of an example system that can revise queries using substitute terms.

FIG. 1 is a diagram of an example system 100 that can revise queries using substitute terms. In general, the system 100 includes a client device 110 coupled to a search system 130 over a network 120. The search system 130 includes a search engine 150, a query reviser engine 170, and a substitute term engine 180. The search system 130 receives a query 105, referred to by this specification as the "original search query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original search query 105. The search system 130 can generate or obtain other queries in numerous ways, e.g., by revising the original search query 105.

In some implementations, the search system 130 can generate a revised search query by adding to the original search query 105 additional terms that are substitute terms of one or more terms that occur in the original search query 105. In other implementations, the search system 130 can generate a revised search query by substituting terms that are substitute terms of terms that occur in the original search query 105, in place of the terms in the original search query 105. As used by this specification, "substitute terms," or other terms used to generate revised search queries, can also be referred to as a "synonyms." Additionally, a "substitution rule" can also be referred to as a "synonym rule." The substitute term engine 180 can determine the additional terms that are candidate substitute terms for the one or more terms that occur in the original search query. The query reviser engine 170 can generate the revised search query. The search engine 150 can use the original search query 105 and the revised queries to identify and rank search results. The search engine 150 can provide the identified search results 145 to the client device 110 on the search results page 155.

The substitute term engine 180 can identify the substitute terms that the query reviser engine 170 can use to generate revised queries by evaluating terms included in previously received queries stored in a query database 190. The queries stored in the query database 190 can include previous queries in which a user considered the results of the queries desirable. For example, the user can click the provided search results from a query, in effect, validating the search results. The queries stored in the query database 190 can include previous queries determined to provide desirable results by the search system 130. For example, the search system 130 can perform a quality thresholding for returned search results from a query. The quality thresholding can include determining search results that have historically been returned for a particular query, and filtering those results that do not satisfy predetermined quality criteria. Search results above the quality threshold can validate a query, which the search system 130 can then include in the query database 190.

Given a first original term, e.g. "cat," the substitute term engine 180 can evaluate terms, e.g. "feline" or "banana," that are candidate substitute terms for the original term. In addition, the substitute term engine 180 can designate certain terms as substitute terms of the first term, as in the case of "feline," and can designate other terms as not substitute terms of the first term, as in the case of "banana." The substitute term engine 180 can base these determinations on rules stored in a substitution rules database 185. Two example substitution rules can be that "feline" is a substitute term for "cat" and "banana" is not a substitute term for "cat". In this specification, although some examples may refer to one or more substitute terms for an original term, an original term of a substitution rule may include multiple terms. For example, a substitution rule may designate "SF" to be a substitute term for the original term "San Francisco."

The search system 130 can define substitution rules to apply generally, or to apply only when particular conditions, or "substitution contexts," are satisfied. A "substitution context," or for brevity, "context," defines one or more terms that co-occur in the query with the original term as well as a position in which the terms occur in the query relative to the original term. A substitution rule that includes a substitution context means that the original term must occur in the query as defined by the substitution context in order for the substitution rule to apply.

Contexts can be adjacent contexts that define one or more terms that occur adjacent to the original term on either side or both, e.g. to the left, or to the right. Adjacent contexts can be specified by a colon notion in which a colon is a placeholder for a particular original term or corresponding substitute term. For example, [how to :] is an example notation for a left adjacent context for the original term "drive" that specifies that the terms "how to" occur to the left of the original term "drive" in the query, e.g. "how to drive a car." Similarly, [how to : a] is an example notation for a left and right adjacent context for the original term "drive" that specifies both terms to the left, "how to," and right, "a," of the original term in the query.

Contexts can also be floating contexts that define one or more terms that co-occur anywhere in the query. Floating contexts can be specified by a "< >" notation. For example, <to > specifies that the term "to" co-occurs with the original term somewhere in the query, and <how to > specifies that the phrase "how to" co-occurs with the original term somewhere in the query.

A special context [:], which may be referred to as the "general context," if associated with a substitution rule, indicates that the substitution rule can apply regardless of other terms co-occurring with the original term or not in the query. For example, the substitution rule having the general context "manual->automatic [:]" indicates that "manual" can be replaced by "automatic" regardless of whether other terms co-occur with manual in the query. On the other hand, the substitution rule "manual->automatic [: car]" indicates that "manual" can be replaced by "automatic" only if the original term "manual" is followed by "car" in the original query.

Multiple distinct substitution rules can generate the same substitute term for a given query term. For example, for the query term "dog" in the query "dog food," the term "pet" can be designated as a substitute term for "dog" by both a substitution rule for "dog" in the general context "[:]" as well as a substitution rule for "dog" when followed by "food," or "[: food]". Furthermore, a substitution rule need not apply in all situations. For example, when the term "cats" is used as a single-term query, the term "felines" can be considered a substitute term for "cats". But when the query includes the term "cats" followed by the term "musical," the system may not use "felines" as a substitute term for "cats." In some implementations, the substitution rules can be stored in the substitution rules database 185 for use by the substitute term engine 180, the query reviser engine 170, or the search engine 150.

In the illustrative example of FIG. 1, the search system 130 can be implemented as computer programs installed on one or more computers in one or more locations that are coupled to each other through a network, e.g., network 120. The search system 130 includes a search system front end 140, e.g., a "gateway" or "proxy" server," that coordinates requests between other parts of the search system 130 and the client device 110. The search system 130 also includes one or more "engines": the search engine 150, a query reviser engine 170, and the substitute term engine 180.

The search system front-end 140, the search engine 150, the query reviser engine 170, and the substitute term engine 180 can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Among other components, the client device 110 includes one or more processors 112, computer readable media 113 that store software applications 114, e.g., a browser or layout engine, an input module 116, e.g., a keyboard or mouse, a communication interface 117, and a display device 118. The computing device or devices that implement the search system front-end 140, the query reviser engine 170, and the search engine 150 may include similar or different components.

In general, the search system front-end 140 receives the original search query 105 from the client device 110. The search system front-end 140 routes the original search query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine, e.g., the search system front-end 140, the query reviser engine 170, and the search engine 150, respectively, may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state A, a user of the client device 110 enters original search query terms 115 for the original search query 105, and the client device 110 communicates the original search query 105 to the search system 130 over the network 120. For example, the user can submit the original search query 105 by initiating a search dialogue on the client device 110, speaking or typing the original search query terms 115 of the original search query 105, and then pressing a search initiation button or control on the client device 110. The client device 110 formulates the original search query 105, e.g., by specifying search parameters. The client device 110 transmits the original search query 105 over the network 120 to the search system 130.

Although this specification refers to the query 105 as an "original" or an "initial" query, such reference is merely intended to distinguish this query from other queries, such as the revised queries that are described below. The designation of the original search query 105 as "original" is not intended to require the original search query 105 to be the first query that is entered by the user, or to be a query that is manually entered. For example, the original search query 105 can be the second or subsequent query entered by the user. In another example, the original search query 105 can be automatically derived, e.g., by the query reviser engine 170. In another example, the original search query 105 can be modified based on prior queries entered by the user, location information, and the like.

During state B, the search system front-end 140 receives the original search query 105 and communicates the original search query 105 to the query reviser engine 170. The query reviser engine 170 can generate one or more revised queries 135 based on the substance of the original search query 105. In some implementations, the query reviser engine 170 generates a revised search query by adding terms to the original search query 105 using substitute terms 125 for terms in the original search query 105. In other implementations, the query reviser engine 170 generates a revised search query by substituting the substitute terms 125 for the corresponding terms of the original search query 105. The query reviser engine 170 can obtain substitute terms 125 for use in revising the original search query 105 from the substitute term engine 180.

During state C, the query reviser engine 170 communicates original search query terms 115 of the original search query 105 to the substitute term engine 180. The substitute term engine 180 can use substitution rules included in the substitution rules database 185 to determine one or more substitute terms 125 for one or more of the original search query terms 115 of the original search query 105.

The substitute term engine 180 communicates substitute terms 125 to the query reviser engine 170 during state D. The query reviser engine 170 generates one or more revised queries 135 by adding substitute terms 125 to the original search query 105. In addition, the query reviser engine 170 can generate one or more revised queries 135 by substituting certain terms of the original search query 105.

The query reviser engine 170 communicates the one or more revised queries 135 to the search system front-end 140 during state E. The search system front-end 140 communicates the original search query 105 along with the one or more revised queries 135 to the search engine 150 as all queries 137 during state F. The search engine 150 generates search results 145 that it identifies as being responsive to the original search query 105 and/or the one or more revised queries 135. The search engine 150 can identify search results 145 for each query using an index 160 that stores indexed documents, e.g., web pages, images, or news articles on the Internet. The search engine 150 can combine and rank the identified search results 145 and communicate the search results 145 to the search system front-end 140 during state G.

The search system front-end 140 generates a search results page 155 that identifies the search results 145. For example, each of the search results 145 can include, but are not limited to, titles, text snippets, images, links, reviews, or other information. The original search query terms 115 or the substitute terms 125 that appear in the search results 145 can be formatted in a particular way, e.g., in bold print and/or italicized print. For example, the search system front-end 140 transmits a document that includes markup language, e.g., HyperText Markup Language or eXtensible Markup Language, for the search results page 155 to the client device 110 over the network 120 at state H. The client device 110 reads the document, e.g., using a web browser, in order to display the search results page 155 on display device 118. The client device 110 can display the original search query terms 115 of the original search query 105 in a query box, or "search box," located, for example, on the top of the search results page 155. In addition, the client device 110 can display the search results 145 in a search results box, for example, located on the left-hand side of the search results page 155.

Figure 2:
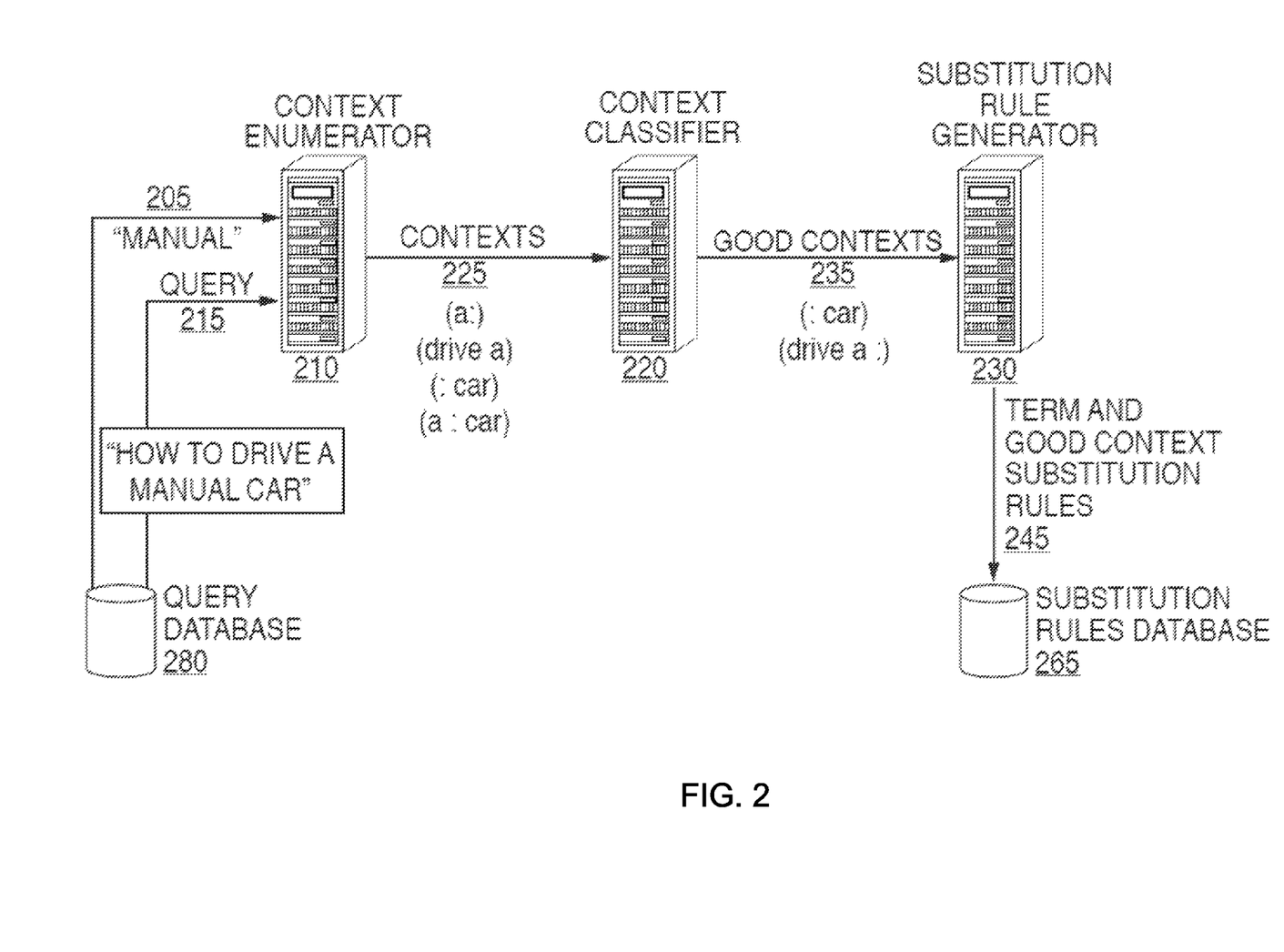
FIG. 2 is a diagram of an example system that evaluates substitution contexts for generating substitution rules.

FIG. 2 is a diagram of an example system that evaluates substitution contexts for generating substitution rules. In general, the system receives a term in a query and generates substitution rules only for contexts that are determined to be good. Bad contexts, on the other hand, are filtered out. Bad contexts can be filtered out as a preprocessing step that eliminates the need for the system to collect statistics on candidate substitution rules that apply in those contexts. One or more components illustrated in FIG. 2 can be part of a general purpose substitute term engine, e.g. substitute term engine 180 of FIG. 1.

In this example, a context enumerator 210 receives, from a query database 290, a term 205, "manual," and a query 215, "how to drive a manual car," in which the term 205 occurs.

The context enumerator 210 uses other terms that co-occur with the term 205 in the query 215 to generate contexts 225 that can potentially be used to generate substitution rules for the term 205. For the query 215, the context enumerator generates contexts [a :], [drive a :], [: car], and [a : car].

A context classifier 220 evaluates the contexts 225 in order to identify good contexts 235, which are passed on for evaluation by a substitution rule generator 230 as candidate substitution rules for the term 205. The substitution rule generator 230 will compute various statistical signals in order to determine which candidate substitution rules defined by (i) the term 205 and (ii) the good contexts 235 are strong enough to be stored as substitution rules 245 in a substitution rule database 285. In other words, bad contexts are filtered out and the substitution rule generator 230 does not need to compute statistical signals for candidate substitution rules defined by the bad contexts.

In this case, of the four enumerated contexts 225, the substitution rule generator 230 computes statistics for only the two best contexts, [: car] and [drive : a]. The context classifier 220 may determine that, for a particular term 205 and query 215, there are no good contexts. In such cases, the substitution rule generator 230 can compute statistical signals only for the general context [:].

Figure 3:
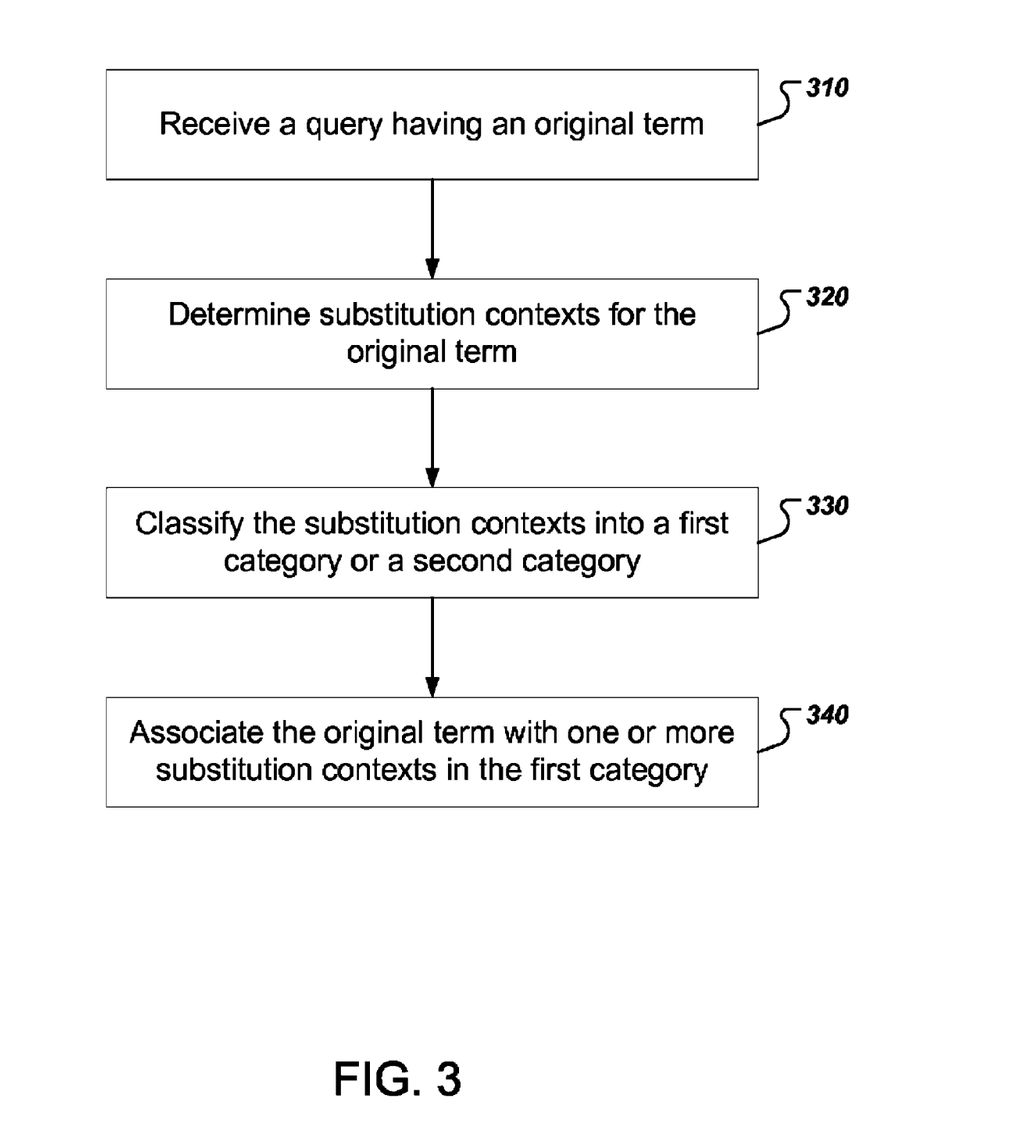
FIG. 3 is a flow chart of an example process for evaluating substitution contexts for generating substitution rules.

FIG. 3 is a flow chart of an example process for evaluating substitution contexts for generating substitution rules. In general, a system receives a query and evaluates substitution contexts for an original term in the query to classify the substitution contexts as good or bad. The bad contexts can then be filtered out and the good contexts can be used to generate substitution rules for the original term. The process can be implemented by one or more computer programs installed on one or more computers. The process will be described as being performed by a system of one or more computers, e.g. the substitute term engine 180 of FIG. 1.

The system receives a query having an original term (310). For example, the system can receive the query "how to drive a manual car" having the original query term "manual." The system can process queries stored in a query database in order to identify substitution rules for terms and phrases occurring the queries.

The system determines substitution contexts for the original term (320). The system can enumerate all contexts for the original term using terms that co-occur in the query. The system can generate both adjacent contexts that define terms occurring adjacent to the original term in the query, as well as floating contexts that define terms that can occur anywhere in the query.

Figure 4:
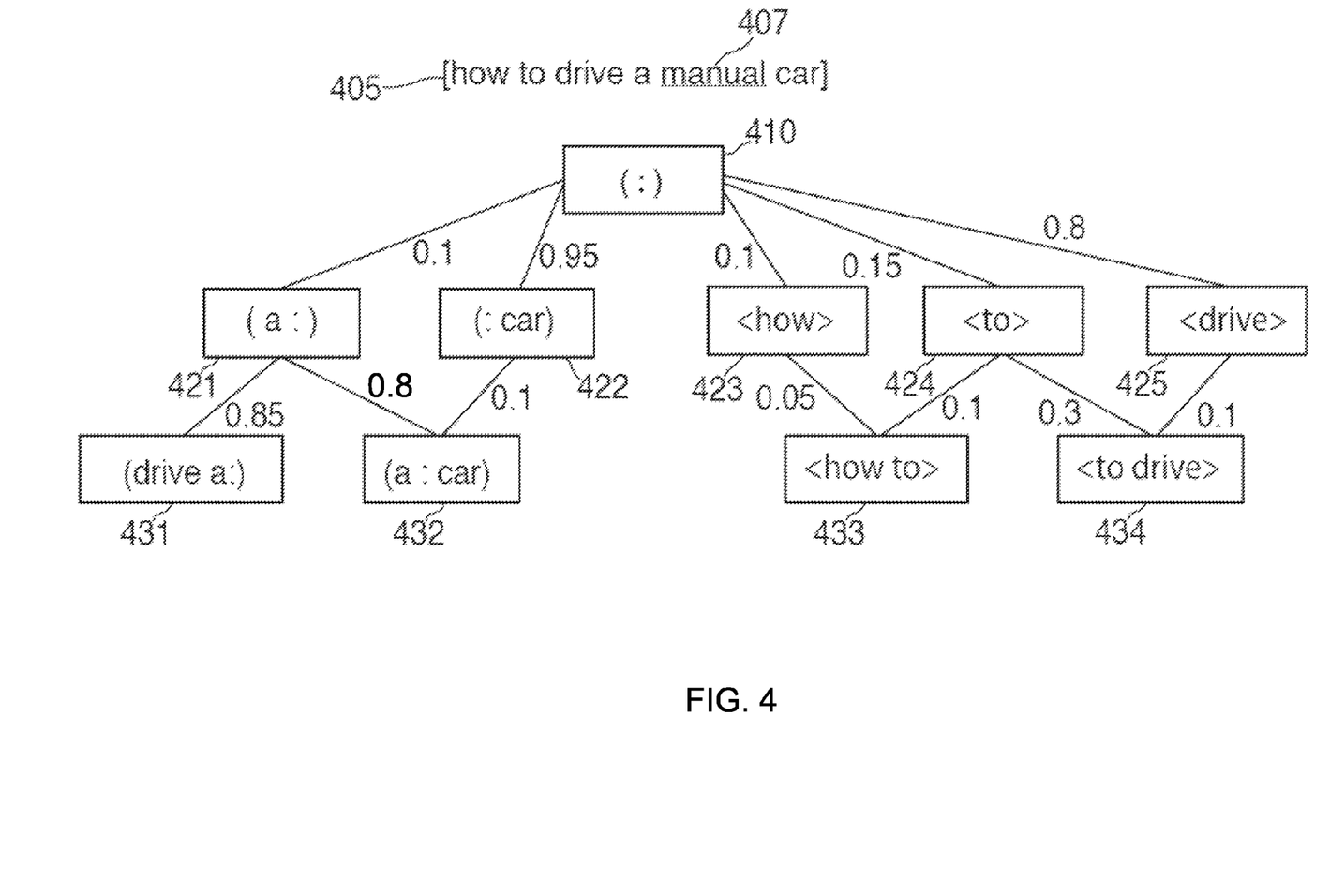
FIG. 4 is a diagram of an example context hierarchy.

In some implementations, the system arranges the contexts into a context hierarchy. FIG. 4 is a diagram of an example context hierarchy. FIG. 4 illustrates an example context hierarchy for the query 405 "how to drive a manual car" and the original query term 407 "manual." The context hierarchy includes nodes and links, in which each node represents a context and a link represents a parent-child relationship between contexts. In general, one context is a parent of another context, a child context, if conditions of the parent context would also apply to the child context. For example, conditions of the parent context node 421 for [a :], in other words, an "a" occurring before the term "manual," would also apply for the child context node 431 [drive a :], in other words, "drive a" occurring before the term "manual." Similarly, conditions of the parent context node 423 for <how> would also apply for child context node 433 for <how to >.

Child contexts generally introduce additional information from the parent context. For example, a child context can add an additional term from the parent context, e.g. the child context [drive a :] introduces an additional term "drive" from the parent context [a :]. A child context may also have a class/instance or category/object relationship with the parent context. For example, a parent context [city :] may have a child context [yew york :]. Some child contexts may introduce information from the parent context in multiple ways, e.g., by both adding a term and by having a class/instance or category/object relationship with the parent context. For example a parent context [city :] may have a child context [new york city :]

Some context nodes have multiple parents, e.g. the context node 432 for [a : car] has both the parent node 421 for [a :] as well as the parent node 422 for [: car]. Some context nodes have multiple children, e.g. the context node 421 for [a :] has both the child context node 431 for [drive a :] and the child context node 432 for [a : car].

The system may generate a context hierarchy with all contexts up to a maximum complexity, where complexity is defined as the number of context terms in a particular context. In FIG. 4, for example, the context hierarchy includes all contexts for the query 405 and the original query term 407 up to a maximum complexity of two terms, even though more contexts of higher complexity are possible, e.g. [how to drive a :].

Referring back to FIG. 3, the system classifies the substitution contexts into a first category or a second category (330). The system can compare the contexts in the context hierarchy to determine which contexts are good because they add meaning to the original term in the query and therefore help to disambiguate the meaning of the original term and which contexts are bad because they do not add meaning to the original term and do little to disambiguate the original term. In general, the system compares parent and child nodes in the context hierarchy by computing a score that represents the relative usefulness of using the context of the child node instead of using the context of the parent node. In other words, the score represents a measure of how much including an additional term of a child context adds meaning to the original term when choosing substitute terms of the original term.

For example, the score between the node 410 for the general context [:] and the node 421 for [a :] is low because using [a :] instead of [:] adds little meaning to the original term "manual." In other words, the intended meaning of "manual" and "a manual" is still ambiguous, as "manual" could refer to a stick shift car or to a user manual.

On the other hand, the score between the node 421 for [a :] and the node 431 for [drive a :] is high because using [drive a :] instead of [a :] adds significant meaning. In other words, the intended meaning of "manual" becomes clearer by adding "drive" to the context because it is much more likely that the original term "manual" refers to a type of car.

The system can classify contexts into a good category and a bad category based on the computed score. For example, the system can classify contexts having a score that satisfies a threshold, e.g. 0.5, 0.7, or 0.9, as good contexts and can classify contexts having a score that does not satisfy the threshold as bad contexts.

The system can compute a score between parent and child contexts in the hierarchy using a variety of criteria that are indicative of adding meaning to the original term.

One example criterion is an alternate set difference, computed by comparing respective alternate sets between two contexts. An alternate set for a particular context is a set of terms that commonly occur in the particular context. For the context [: car], the alternate set includes terms that commonly occur immediately before "car," e.g. "manual," "stick shift," and "fast." The system can generate an alternate set for a substitution context by processing data in any appropriate textual collection, e.g. web documents, digitized books, or query databases, and generating a set of terms that occur most frequently in the particular context along with a measure of how frequently each alternate term occurs.

The system can represent an alternate set using a vector in which each vector position corresponds to a particular term and the value of the corresponding position is a measure of frequency for the corresponding term. For example, the system can compute a raw number of occurrences of each alternate term or a frequency of each alternate term among all alternate terms.

In some implementations, the system computes a "seen rate" and an "unseen rate" for each alternate term. A seen rate is a number of times the alternate term occurred in the context compared to the number of times the original term occurred in the context. For example, if the textual collection is queries, the seen rate can be given by Equation (1).

$$\text{seen\_rate} = \frac{Q_A}{Q_O} \quad (1)$$

In Equation (1), $Q_A$ is a number of queries in a collection that include the alternate term occurring in the context, and $Q_O$ is a number of queries in the collection that include the original term occurring in the context. The unseen rate can be given by Equation (2).

$$\text{unseen\_rate} = 1 - \text{seen\_rate} \quad (2)$$

After determining the alternate sets between two contexts in the context hierarchy, the system can compare the alternate sets to compute the alternate set difference. In some implementations, the system computes the alternate set difference as a Kullback-Leibler divergence between the alternate sets, which can be given by Equation (3) for alternate sets P and Q. In Equation (3), $r_p(a)$ is the seen rate of an alternate term a for the alternate set P, $u_p(a)$ is the unseen rate of the alternate term a for the alternate set P, $r_q(a)$ is the seen rate of the alternate term a for the alternate set Q, and $u_q(a)$ is the unseen rate of the alternate term a for the alternate set Q.

$$\text{alternate\_set\_diff} = \sum_{a \in P,Q} \left[ r_p(a) \times \ln \frac{r_p(a)}{r_q(a)} + u_p(a) \times \ln \frac{u_p(a)}{u_q(a)} \right] \quad (3)$$

If the child context adds significant meaning to the original term, the distribution in the textual collection of alternate terms is expected to be vastly different, resulting in a high alternate set difference. Therefore, the system can consider a high alternate set difference to be indicative of a good context. Alternatively, the system can compute a measure of similarity between the alternate sets, e.g. using a cosine or other vector similarity measure, and consider a high measure of similarity to be indicative of a bad context.

Another example criterion for computing a score between a parent and a child context is an empty fraction rate. The empty fraction rate measures how often the original term and the terms of a particular context are the only terms in a query. The system can consider a child context to be a good context if the original term and the terms of the child context are often the only terms in a query. On the other hand, if the original term and the terms of the child context are more often joined by other terms in a query, the system can consider the child context to be unimportant.

The system can compute an empty fraction rate for an original term and a context according to how often the original term and the context terms are the only terms in a query. The system can compute the empty fraction rate according to Equation (5).

$$\text{empty\_fraction} = \frac{Q_C}{Q_{C+}} \quad (5)$$

$Q_C$ is a number of queries that contain only the original term and the context terms, and $Q_{C+}$ is a number of queries that contain the original term, the context terms, and one or more other terms. In some implementations, the system computes the empty fraction rate for the child context and determines whether the empty fraction rate of the child context satisfies a threshold. If the empty fraction rate satisfies the threshold, the system can consider the child context to be a good context. If the empty fraction rate does not satisfy the threshold, the system can consider the child context to be a bad context.

Another example criterion for computing a score between a parent and a child context is a comparison of histograms of co-occurring terms. The system can compute vectors of terms that co-occur in a textual collection with the original term in the parent context and terms that co-occur in the textual collection with the original term in the child context. The system can then compute a difference vector between the two co-occurrence frequency vectors and evaluate the term importance of a number N of co-occurring terms with the biggest co-occurrence frequency differences between the parent and child vectors. Good child contexts tend to have more meaningful words having the biggest co-occurrence frequency differences, and bad child contexts tend to have less meaningful words, e.g. common words, with the biggest co-occurrence frequency differences. The system can compute a measure of importance of co-occurring terms according to any appropriate measure, e.g. an inverse document frequency value over a textual corpus. The system can then compute score for a number N of the most differently occurring terms weighted by corresponding measures of importance.

The system can select or combine any of the above-mentioned criteria in any appropriate way to compute a score between a parent and child context. For example, the system can compute weights for each of the criteria that indicate an importance of each particular measure to compute the score as a weighted average.

For child contexts that have multiple parents, e.g. the child node 432 for [a : car], the system may need to select or combine scores from the two parents. The system can compute measures of central tendency for any of the statistics, e.g. an arithmetic mean or geometric mean, a median, a mode, a minimum, or a maximum.

After computing a score for each context in the context hierarchy, the system can classify each context as either a good context or a bad context, e.g. by comparing the score to a threshold. The system may alternatively select a predetermined number or ratio of highest-scoring contexts to be good contexts and consider the remaining contexts to be bad contexts.

The system associates the original term with one or more substitution contexts in the first category (340). In general, the system will discard bad contexts in the second category, which causes the system not to compute substitute term statistics in the next stage of the substitute term pipeline. Instead, only good contexts will be eligible for evaluation and inclusion as substitute term rules.

The system may determine that all child contexts in the context hierarchy are bad contexts. In those cases, the system can classify the only the general context into the first category and associate the original term with only the general context [:]. In some implementations, if the system classifies a single child context in the context hierarchy as a good context, the system does not associate the original term with the general context [:]. In other words, the system classifies the general context into the second category, effectively discarding the general context [:], and does not collect statistics for the general context in the next stage of the substitute term pipeline.

Figure 5:
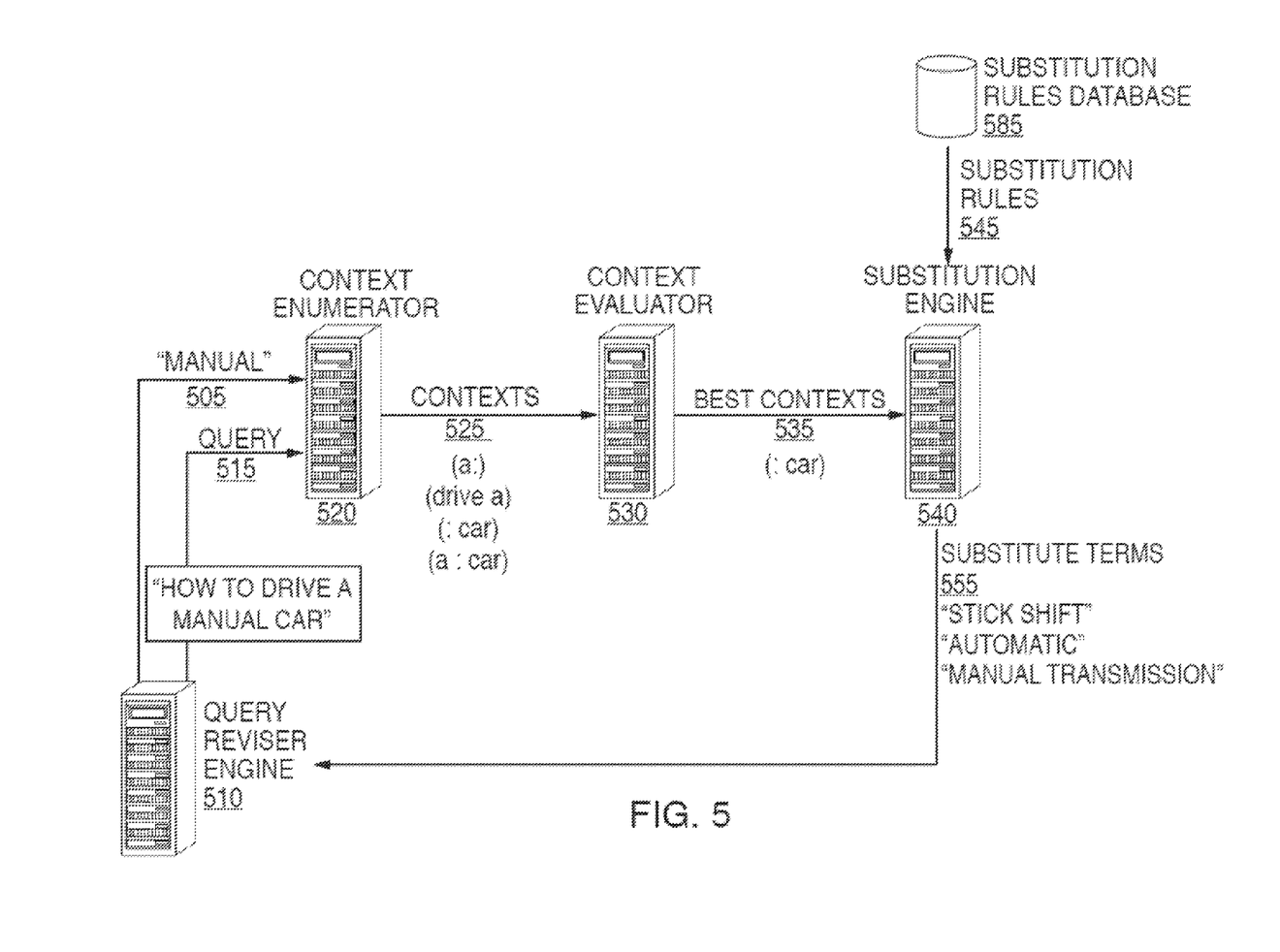
FIG. 5 is a diagram of an example system that evaluates substitution contexts for query revision.

FIG. 5 is a diagram of an example system that evaluates substitution contexts for query revision. In general, the system receives a term in a query and generates substitute terms for a context that is determined to be the best context. The substitute terms generated can be passed to a query revision engine for performing online query revision, that is, after a query has been received from a user and before search results have been provided to the user.

A context enumerator 520 receives, from a query reviser engine 510, a term and a query 515 in which the term 505 occurs. The context enumerator 520 uses other terms that co-occur with the term 505 in the query 515 to generate contexts 525 that can potentially match substitution rules for the term 505 in a substitution rules database 585.

As in the example above for FIG. 2, the context enumerator 510 can generate the contexts 525 [a :], [drive a:], [: car], and [a : car] for the query "how to drive a manual car."

A context evaluator 530 evaluates the contexts 525 in order to select one or more best contexts 535. In this example, the context evaluator 530 has determined that [: car] is the best context 535 and passes the selected best context 535 to substitution engine 540.

The substitution engine 540 determines if the best context 535 matches any substitution rules 545 in a substitution rules database 585 for the query term 505. The substitution engine 540 can use the query term 505 and best context 535 as a key to the substitution rules database 585, and in response, the substitution engine 540 can receive a set of substitute terms 555. In this example, substitute terms 555 for the original term 505 "manual" in the best contest 535 [: car] are "stick shift," "automatic," and "manual transmission."

The substitution engine 540 can provide the resulting substitute terms 555 back to the query reviser engine 510 for generating revised queries.

Figure 6:
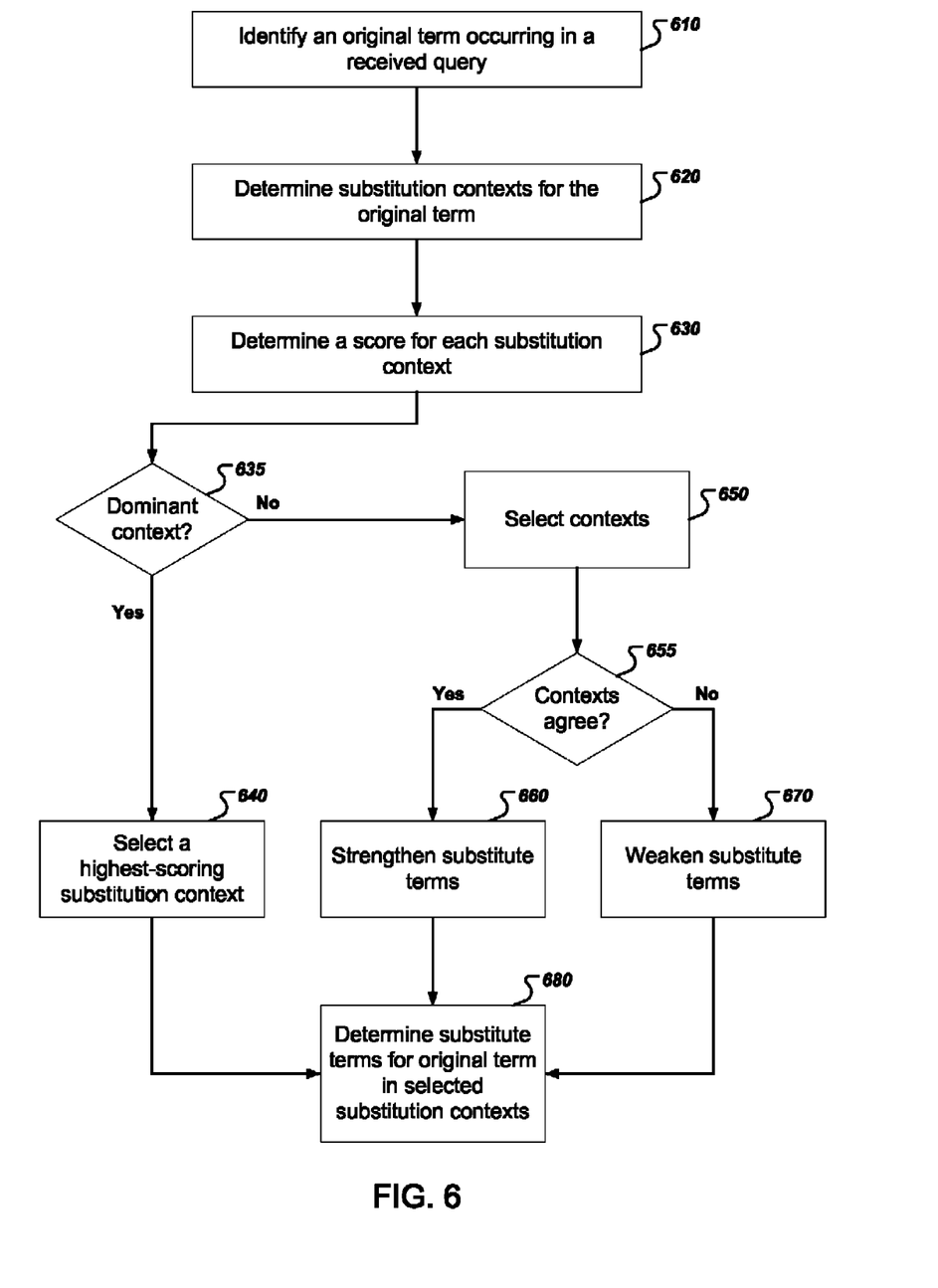
FIG. 6 is a flow chart of an example process for evaluating substitution contexts for query revision.

FIG. 6 is a flow chart of an example process for evaluating substitution contexts for query revision. In general, a system receives a term and a query and determines which substitution contexts for the term are good or bad. The process can be implemented by one or more computer programs installed on one or more computers. The process will be described as being performed by a system of one or more computers, e.g. the substitute term engine 180 of FIG. 1.

The system identifies an original term occurring in a received query (610).

The system determines substitution contexts for the original term (620). As mentioned above with reference to FIG. 3, the system can enumerate all adjacent and floating contexts for the original term using terms that co-occur in the query. The system can similarly arrange the enumerated contexts into a context hierarchy according to parent/child context relationships.

Figure 7:
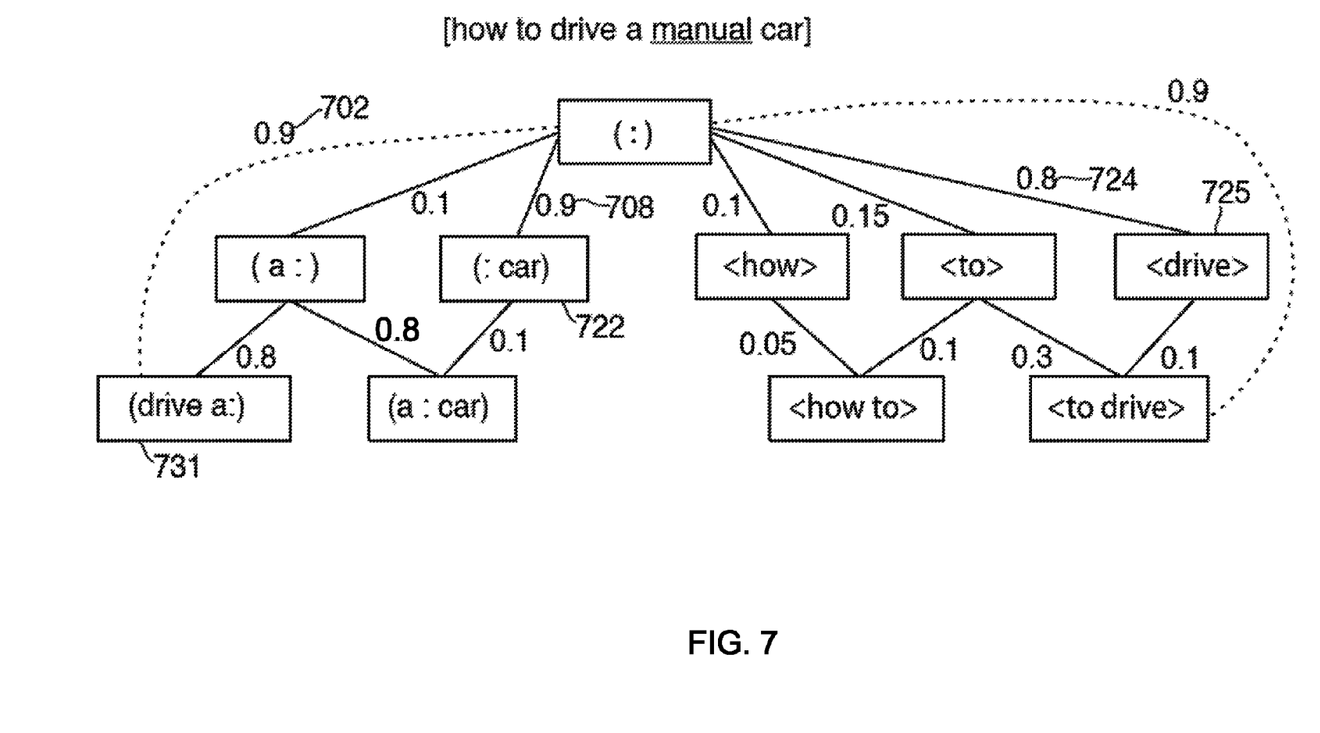
FIG. 7 is a diagram of an example context hierarchy.

FIG. 7 is a diagram of an example context hierarchy. The context hierarchy in FIG. 7 is similar to the context hierarchy illustrated in FIG. 4, however, additional lines indicate that additional scores are computed to compare some lowest-level contexts to the general context in order to compare contexts that otherwise do not share a parent.

Referring back to FIG. 6, the system determines a score for each substitution context (630). Again, the system can compute a score that represents a measure of how much including an additional term of a child context adds meaning to the original term when choosing substitute terms of the original term. The system can use similar scoring criteria as described above with reference to FIG. 3.

For contexts with a complexity of two or greater, the system may only compare the context directly with the general context during online evaluation. Thus, the system can compute an overall score for such contexts by combining the offline score for the context with the online score that compares the context directly with the general context. For example, the system can choose the worst of the two or the best of the two. The system can compute a measure of central tendency, e.g. an arithmetic or geometric mean, between the offline and online scores, or the system can use a prediction model to compute a predicted score using both the offline and online scores.

In some implementations, the system classifies the contexts as either good or bad using the combined overall score of the contexts, e.g. by comparing the overall score to a threshold. The system then discards the bad contexts so that only contexts that are classified as good contexts remain to be used for query revision.

The system can then compute a second score by comparing the remaining good contexts directly with the general context. In other words, after choosing the good contexts, the system generates a final ranking of the contexts in terms of only the general context. For example, referring to FIG. 7, the system can discard all context nodes except for the nodes 731, 722, and 725. The system can then compute a final ranking using the scores 702, 703, and 704 that compare the contexts to the general context.

The system determines if there is a dominant substitution context (635). The system can determine if a highest-scoring substitution context has a score that is significantly higher than all other substitution contexts. For example, the system can determine if a highest-scoring substitution context has a higher score than all other substitution contexts by a particular margin, e.g. by either a particular raw numerical score or as a measure of dominance over the other signals. If so, the system can select a highest-scoring substitution context (branch to 640). In other words, when performing query revision, the system can consider only the highest-scoring substitution context when generating substitute terms for the original query term. For example, if [drive a :] was the highest-scoring context for the original term "manual," the system would not use other enumerated contexts when generating substitute terms for "manual," even of those other contexts were previously classified as good contexts.

If the highest-scoring substitution context is not dominant, the system can select substitution contexts for query revision (650). The system can for example select a number of the highest-scoring substitution contexts. As mentioned above, the system may first classify the substitution contexts as good or bad, and the system can filter out the bad substitution contexts. If all enumerated substitution contexts are classified as bad, the system can select only the general context.

The system determines whether the selected substitution contexts agree (655). To determine whether two contexts agree, the system can compute a score using an alternate set difference, an empty fraction rate, or histograms of co-occurring terms, e.g. as described above with reference to FIG. 3. If the score satisfies a closeness threshold, e.g. is lower than a particular number, the system can consider the contexts to agree. For example, the contexts [drive a :] and [: car] for the original term "manual" are likely to agree because both are about cars and not about a different meaning of the original term "manual," e.g. a user guide. On the other hand, the floating context <how to > is not likely to agree with [drive a:] because <how to > is more general.

In some implementations, the system clusters the contexts by score into groups of contexts that agree. If only one group of contexts exists after cluster, the system can determine that the contexts agree (branch to 660). If there are at least two groups of contexts, the system can determine that the contexts do not agree (branch to 670).

If the contexts agree, the system can strengthen substitute terms for the original term during search result scoring (660). The system can obtain search results using a revised search query that includes substitute terms for an original term. The system can rank the search results according to an information retrieval (IR) score computed for each document. At scoring time, the system can count, in each document referenced by the search results, occurrences of original query terms as well as substitute terms for the original terms in order to compute a document score.

The system need not give equal weight to occurrences in documents of the original terms and the substitute terms when computing a document score. Rather, the system can alter the weight given to a particular substitute term to reflect a confidence that particular substitute term is a reliable or trusted substitute for the original term.

Thus, if the system determines that two substitution contexts agree, the system can consider substitute terms generated using those substitution contexts to be reliable and trusted. The system can therefore boost the IR score of documents that include occurrences of such reliable substitute terms by increasing the weight given to occurrences of the substitute terms in the documents. For example, the system may by default compute an IR score for a document by assigning a count of 1.0 to an occurrence of an original term and a count of 0.5 to an occurrence of a substitute term. If the substitution contexts agree, the system can instead assign a count of 0.75 to an occurrence of a substitute term generated from the reliable substitution context, thereby boosting the IR score of documents that include occurrences of substitute terms from the reliable substitution context.

Conversely, if the contexts do not agree, the system can weaken substitute terms for the original term during search result scoring (670). Two possible substitution contexts that do not agree for a particular original term is a sign that the meaning of the original term in the query is ambiguous. Thus, the system can be more cautious during query revision or scoring. The system can be more cautious during query revision by declining to generate any substitute terms during query revision in the case of disagreeing substitution contexts. The system can be more cautious during scoring by adjusting the weight given to substitute terms of the original query term in order to demote the IR score of documents that include occurrences of substitute terms for the potentially ambiguous original term. The system determines one or more substitute terms for the original term in the context of the selected substitution contexts (650). The system can for example use the original term and the one or more selected contexts as keys to previously generated substitution rules in a substitution rules database. The system can then use matching substitution rules to generate substitute terms for the original term to be used for expanding the received query.

In some cases, the substitution rules database may not include any substitution rules for the original term occurring in the highest-scoring substitution context. In such cases, the system can decide not to provide any substitute terms for expanding the received query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit (SDK), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED (organic light-emitting diode) display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a query;
   identifying an original term occurring in the query;
   determining a plurality of substitution contexts for the original term occurring in the query, wherein a substitution context specifies a context in which the original term in the query is replaced by a substitute term, and wherein a substitution context includes one or more context terms and an indication of a position in the query of the original term relative to the one or more context terms;
   generating a context hierarchy of the plurality of substitution contexts, wherein any conditions of a parent context in the context hierarchy also apply to each of one or more child contexts of the parent context in the context hierarchy, and wherein each child context in the context hierarchy includes all of the terms of a parent context of the child context as well as an additional term that does not occur in the parent context of the child context;
   determining a score for each substitution context of the plurality of substitution contexts including comparing a particular substitution context to its parent context in the context hierarchy;
   ranking the plurality of substitution contexts based on the score of each substitution context; and
   determining one or more substitute terms for the original term occurring in the query in a context specified by a highest-ranking substitution context of the plurality of substitution contexts.

2. The method of claim 1, further comprising:
classifying the plurality of substitution contexts into a first category or a second category based on the respective score of each substitution context; and
ranking substitution contexts in the first category.

3. The method of claim 1, wherein determining a score for a substitution context comprises:
comparing a particular substitution context to the general context; and
computing a combined score using the comparison of the particular substitution context to the general context and the comparison of the particular substitution context to the general context.

4. The method of claim 1, where the score represents a measure of how much meaning the substitution context adds to the original term compared to the parent substitution context.

5. The method of claim 1, wherein determining a score for a substitution context comprises:
generating first frequencies of occurrence for alternate terms that occur in the substitution context in a textual collection;
generating second frequencies of occurrence for alternate terms that occur in the parent substitution context in the textual collection; and
comparing the first frequencies of occurrence and the second frequencies of occurrence.

6. The method of claim 1, wherein computing a score for a substitution context having multiple parent contexts in the context hierarchy comprises:
determining a first score for a first parent substitution context of the substitution context;
determining a second score for a second parent substitution context of the substitution context; and
selecting the minimum of the first score or the second score as the score for the substitution context.

7. The method of claim 1, comprising:
computing a score between two of the plurality of substitution contexts, wherein the score represents how closely the substitution contexts agree;
determining, based on the score, that the substitution contexts do not agree; and
in response to determining that the substitution contexts do not agree, decreasing a weight given to substitute terms for the original term generated using the substitution contexts that do not agree.

8. The method of claim 1, comprising:
computing a score between two of the plurality of substitution contexts, wherein the score represents how closely the substitution contexts agree;
determining, based on the score, that the substitution contexts agree; and
in response to determining that the substitution contexts agree, increasing a weight given to substitute terms for the original term generated using the substitution contexts that agree.

9. A system comprising:
one or more computers and one or more storage devices storing instructions that are operable, when executed by the one or more computers, to cause the one or more computers to perform operations comprising:
receiving a query;
identifying an original term occurring in the query;
determining a plurality of substitution contexts for the original term occurring in the query, wherein a substitution context specifies a context in which the original term in the query is replaced by a substitute term, and wherein a substitution context includes one or more context terms and an indication of a position in the query of the original term relative to the one or more context terms;
generating a context hierarchy of the plurality of substitution contexts, wherein any conditions of a parent context in the context hierarchy also apply to each of one or more child contexts of the parent context in the context hierarchy, and wherein each child context in the context hierarchy includes all of the terms of a parent context of the child context as well as an additional term that does not occur in the parent context of the child context;
determining a score for each substitution context of the plurality of substitution contexts including comparing a particular substitution context to its parent context in the context hierarchy;
ranking the plurality of substitution contexts based on the score of each substitution context; and
determining one or more substitute terms for the original term occurring in the query in a context specified by a highest-ranking substitution context of the plurality of substitution contexts.

10. The system of claim 9, wherein the operations further comprise:
classifying the plurality of substitution contexts into a first category or a second category based on the respective score of each substitution context; and
ranking substitution contexts in the first category.

11. The system of claim 9, wherein determining a score for a substitution context comprises:
comparing a particular substitution context to the general context; and
computing a combined score using the comparison of the particular substitution context to the general context and the comparison of the particular substitution context to the general context.

12. The system of claim 9, where the score represents a measure of how much meaning the substitution context adds to the original term compared to the parent substitution context.

13. The system of claim 9, wherein determining a score for a substitution context comprises:
generating first frequencies of occurrence for alternate terms that occur in the substitution context in a textual collection;
generating second frequencies of occurrence for alternate terms that occur in the parent substitution context in the textual collection; and
comparing the first frequencies of occurrence and the second frequencies of occurrence.

14. The system of claim 9, wherein computing a score for a substitution context having multiple parent contexts in the context hierarchy comprises:
determining a first score for a first parent substitution context of the substitution context;
determining a second score for a second parent substitution context of the substitution context; and
selecting the minimum of the first score or the second score.

15. The system of claim 9, wherein the operations comprise:
computing a score between two of the plurality of substitution contexts, wherein the score represents how closely the substitution contexts agree;
determining, based on the score, that the substitution contexts do not agree; and in response to determining that the substitution contexts do not agree, decreasing a weight given to substitute terms for the original term generated using the substitution contexts that do not agree.

16. The system of claim 9, wherein the operations comprise:
computing a score between two of the plurality of substitution contexts, wherein the score represents how closely the substitution contexts agree;
determining, based on the score, that the substitution contexts agree; and
in response to determining that the substitution contexts agree, increasing a weight given to substitute terms for the original term generated using the substitution contexts that agree.

17. A computer program product, encoded on one or more non-transitory computer storage media, comprising instructions that when executed by one or more computers cause the one or more computers to perform operations comprising:
receiving a query;
identifying an original term occurring in the query;
determining a plurality of substitution contexts for the original term occurring in the query, wherein a substitution context specifies a context in which the original term in the query is replaced by a substitute term, and wherein a substitution context includes one or more context terms and an indication of a position in the query of the original term relative to the one or more context terms;
generating a context hierarchy of the plurality of substitution contexts, wherein any conditions of a parent context in the context hierarchy also apply to each of one or more child contexts of the parent context in the context hierarchy, and wherein each child context in the context hierarchy includes all of the terms of a parent context of the child context as well as an additional term that does not occur in the parent context of the child context;
determining a score for each substitution context of the plurality of substitution contexts including comparing a particular substitution context to its parent context in the context hierarchy;
ranking the plurality of substitution contexts based on the score of each substitution context; and
determining one or more substitute terms for the original term occurring in the query in a context specified by a highest-ranking substitution context of the plurality of substitution contexts.

18. The computer program product of claim 17, wherein determining a score for a substitution context comprises:
comparing a particular substitution context to the general context; and
computing a combined score using the comparison of the particular substitution context to the general context and the comparison of the particular substitution context to the general context.

19. The computer program product of claim 17, where the score represents a measure of how much meaning the substitution context adds to the original term compared to the parent substitution context.

20. The computer program product of claim 17, wherein determining a score for a substitution context comprises:
generating first frequencies of occurrence for alternate terms that occur in the substitution context in a textual collection;
generating second frequencies of occurrence for alternate terms that occur in the parent substitution context in the textual collection; and
comparing the first frequencies of occurrence and the second frequencies of occurrence.

21. The computer program product of claim 17, wherein computing a score for a substitution context having multiple parent contexts in the context hierarchy comprises:
determining a first score for a first parent substitution context of the substitution context;
determining a second score for a second parent substitution context of the substitution context; and
selecting the minimum of the first score or the second score.

22. The computer program product of claim 17, wherein the operations comprise:
computing a score between two of the plurality of substitution contexts, wherein the score represents how closely the substitution contexts agree;
determining, based on the score, that the substitution contexts do not agree; and
in response to determining that the substitution contexts do not agree, decreasing a weight given to substitute terms for the original term generated using the substitution contexts that do not agree.

23. The computer program product of claim 17, wherein the operations comprise:
computing a score between two of the plurality of substitution contexts, wherein the score represents how closely the substitution contexts agree;
determining, based on the score, that the substitution contexts agree; and
in response to determining that the substitution contexts agree, increasing a weight given to substitute terms for the original term generated using the substitution contexts that agree.

* * * * *